No. 661,589. Patented Nov. 13, 1900.
A. F. RIETZEL.
ELECTRIC WELDING APPARATUS.
(Application filed Sept. 23, 1899.)
(No Model.) 3 Sheets—Sheet 2.
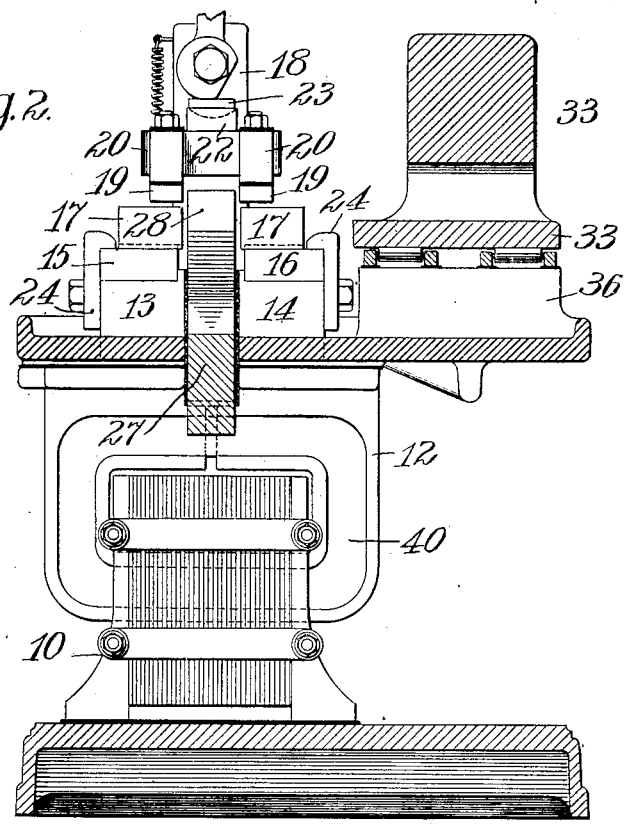
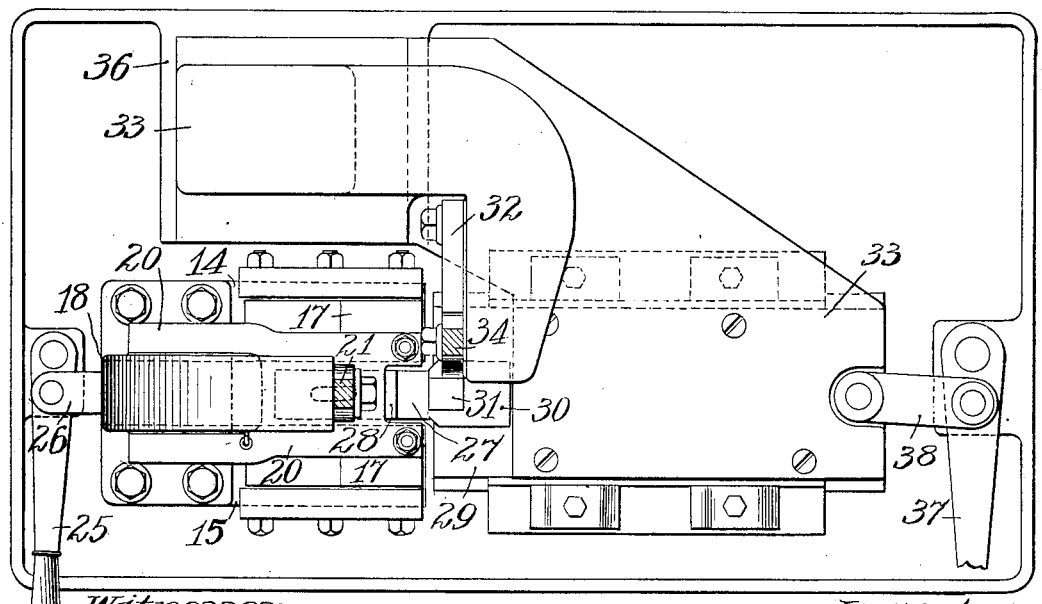
Witnesses:
C. L. Belcher
M. J. Ludlow
Inventor
Adolph F. Rietzel
By his attorney No. 661,589. Patented Nov. 13, 1900.
A. F. RIETZEL.
ELECTRIC WELDING APPARATUS.
(Application filed Sept. 23, 1899.)
(No Model.) 3 Sheets—Sheet 3.
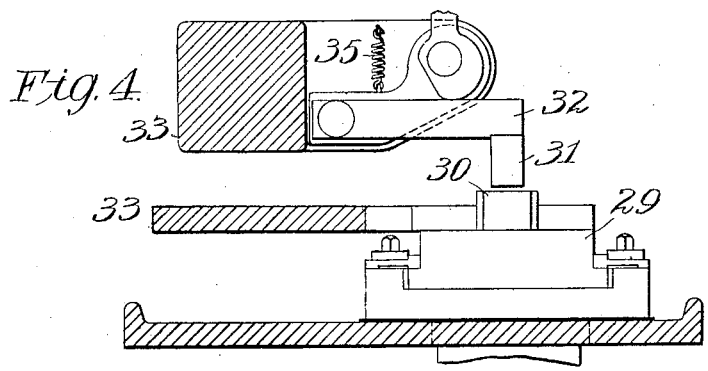
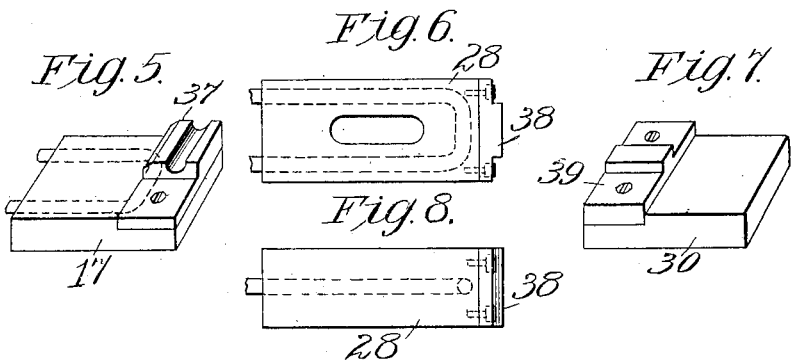
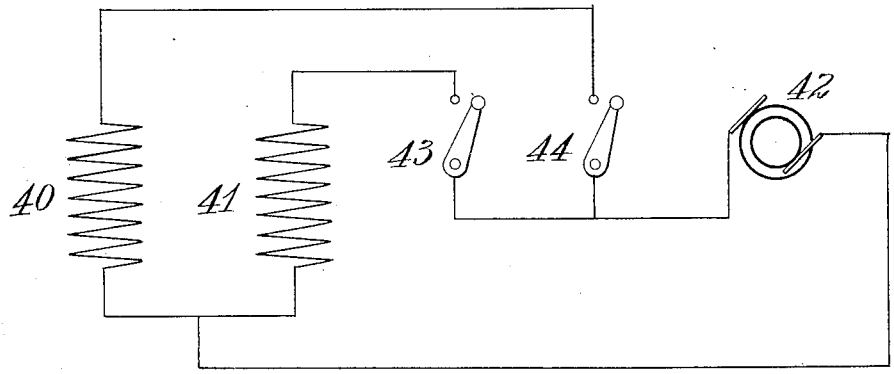
Witnesses:
C. L. Belcher
M. J. Ludlow
Inventor
Adolph F. Rietzel
By his attorney

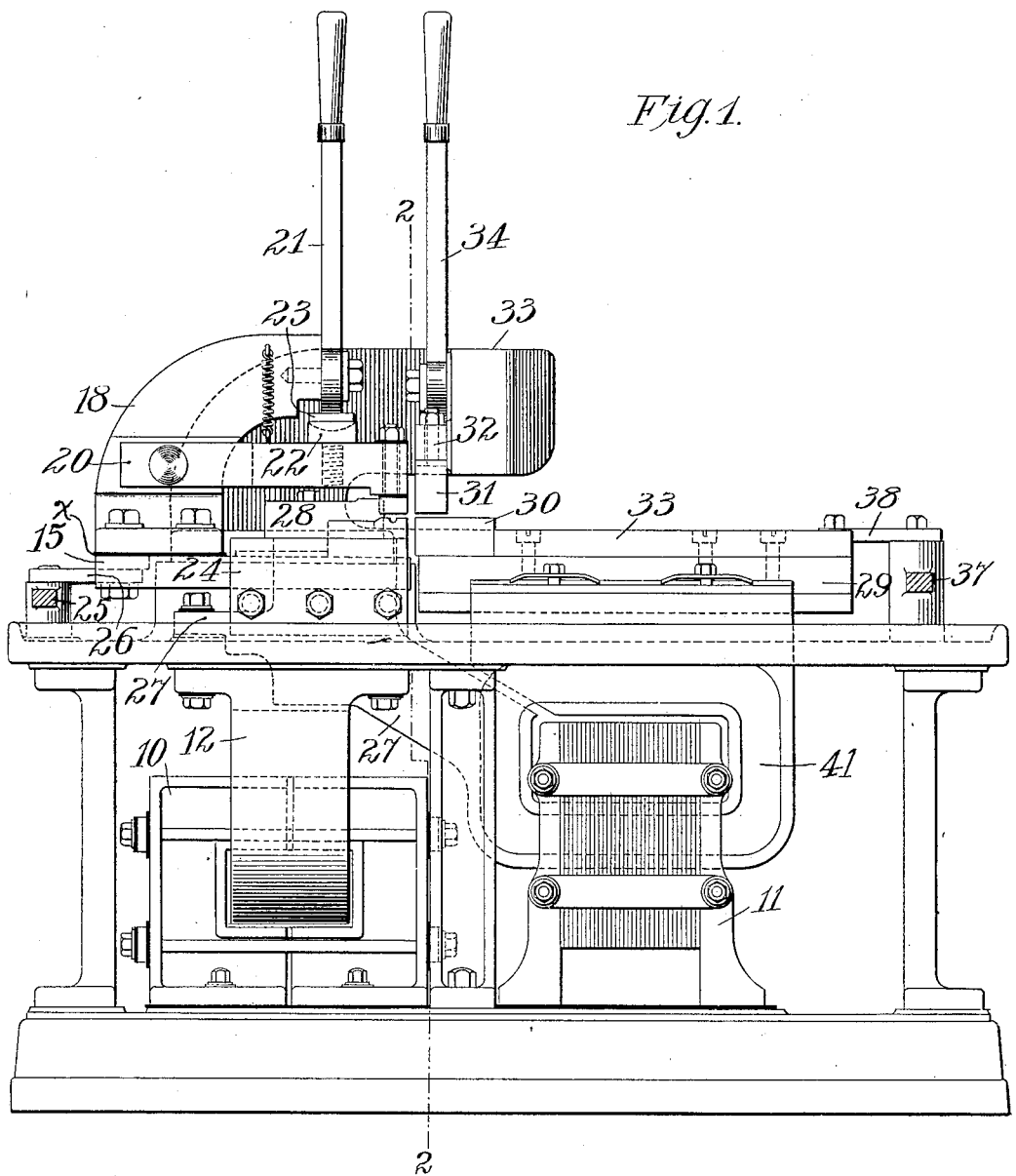

UNITED STATES PATENT OFFICE.

ADOLPH F. RIETZEL, OF LYNN, MASSACHUSETTS, ASSIGNOR TO THE THOMSON ELECTRIC WELDING COMPANY, OF SAME PLACE.

ELECTRIC WELDING APPARATUS.

SPECIFICATION forming part of Letters Patent No. 661,589, dated November 13, 1900.

Application filed September 23, 1899. Serial No. 731,397. (No model.)

*To all whom it may concern:*

Be it known that I, ADOLPH F. RIETZEL, a citizen of the United States, and a resident of Lynn, in the county of Essex and State of Massachusetts, have invented certain new and useful Electric Metal-Working Apparatus, of which the following is a specification.

This invention relates to improvements in electric metal-working apparatus, and particularly to such apparatus designed for welding.

The principal object of the invention is to organize a welding-machine by which pieces unequal in sectional area or mass per linear unit may be readily and perfectly welded.

Another object is to construct an electric metal-working machine wherein the heating of the metal to be worked can be readily controlled, and when the parts or pieces of metal to be welded are of different sectional area or of different conductivity or of different specific heat the one requiring the longer time in heating may be heated alone for a time before the heat is applied to both.

Another object of the invention is to combine in one apparatus an electric heating device with an electric welding device, whereby the parts to be welded may be properly brought to a welding heat and perfectly united without detriment to either.

To this end the invention consists in the construction, combination, and arrangement of mechanism substantially as hereinafter fully described and claimed.

In the accompanying drawings, which form a part of this specification, Figure 1 is a front elevation of a metal-working apparatus embodying the invention. Fig. 2 is a vertical transverse section taken on the broken plane indicated by the line 2 2, Fig. 1, as viewed from the right of said plane. Fig. 3 is a plan of the apparatus. Fig. 4 is a vertical section of the upper part of the apparatus, taken in the same plane as Fig. 2, but viewed from the left of the plane. Figs. 5, 6, 7, and 8 are detail perspective views of the jaws of the work-holders, and Fig. 9 is a diagram of the circuits of the primaries of the transformers.

It has heretofore been a difficult matter to electrically weld a thin piece or bar to a thick one, and particularly so when the former was to be welded to the side of the latter. Because of the difference in sectional area or mass per linear unit the thin piece would reach the welding-point long before the thick one and probably burn away before a weld could be effected. The parts of this apparatus are so constructed and arranged that the thick piece may be heated until it approaches the welding temperature before the thin one is introduced into the circuit. Its introduction is timed so that both pieces reach the welding heat at the same instant and a good and proper weld is effected. One way of effectively accomplishing this purpose is by using two transformers, one for heating the thick piece and the other for making the weld.

In the drawings the heating-transformer is indicated by 10 and the welding-transformer by 11. In the heating-transformer the secondary is seen at 12. It consists of a metal yoke recessed to receive the primary coil 40 and is bolted to the table-top, as shown. The terminals 13 and 14 of this secondary protrude through the table. Upon one terminal is secured a slide 15 and upon the other a slide 16, which carry at their forward ends the lower jaws or members 17 of the clamps or work-holders. Mounted upon the slides 15 and 16, but insulated therefrom, as at $x$, Fig. 1, is an arm 18, on which the other members or jaws 19 of said work holders or clamps are mounted. These upper jaws are seated in an insulated manner in the free end of a bifurcated lever 20, which is pivoted to the arm 18. This lever may be depressed by any suitable means, such as the cam-lever 21, also pivoted to the arm 18. Upon the lever 20 is a stud 22, having a cup-shaped head in which a block 23 is movably fitted and intended to receive the cam of the lever 21. The ball-and-socket form of connection between the block 23 and the lever 20 affords a full flat contact always between the said cam and block. The stud 22 is vertically adjustable in the lever 20, thereby regulating the opening between the jaws 17 and 19. A suitable spring is employed to hold the lever 20 up against the cam, and thereby cause the opening of the jaws or work-holders as soon as the cam-lever 21 is pulled down. The slides 15 and 16 are held to the terminals of the secondary by suitable side pieces or cleats 24.

The slides 15 and 16 and the parts supported thereby may be moved back and forth by any suitable means, such as a lever 25, which is connected to the base of the arm 18 by means of the link 26.

The welding-transformer has its secondary in a plane intersecting that of the heating-transformer. It is suitably secured to the table and has one of its terminals projected and seated in an insulated manner between the terminals of the heating-transformer. This terminal is indicated by 27 and is capped by an adjustable and removable abutment 28. The other terminal of this secondary has mounted thereon a slide 29, which carries at its forward end the lower jaw or member of the work-holder, as indicated by 30. The upper jaw or member of the work-holder is indicated by 31 and is carried on the end of the lever 32. This lever is pivoted to the recurved and curved arm 33, which is mounted on the slide 29. A cam-lever 34 serves to depress the lever 32, and a spring 35 retracts it in substantially the same manner as lever 20 is manipulated. The arm 33 is bolted to the slide 29. Thence its base extends under the plane of the work-holders and is supported upon a pedestal 36, which rises from the table-top or bed of the machine. Preferably antifriction-rollers are placed upon the pedestal to facilitate the movement of the arm 33. From that part of the base over the pedestal the arm recurves and then curves forward in a plane above that of the work-holders, and it is on this latter portion that the lever 32 is pivoted. By this construction of the support for the lever 32 unlimited open space is provided at one side of the work-holders, whereby it is possible to operate upon work of any area.

Any suitable means for reciprocating the slide 29 and the parts carried thereby may be employed, such as the lever 37 and link 38. Obviously the work-holders 30 and 31 may be fixed against reciprocation and the abutment 28 made to reciprocate, in which case the lever 32 would be mounted on a fixed arm arising from the pedestal 36.

The projecting terminal 27 of the welding secondary is insulated both electrically and thermally from the terminals of the heating secondary by means of asbestos, as shown in Fig. 2, both at the sides thereof and underneath.

The work-holders are constructed so that the clamping-faces may be readily renewed. For instance, the jaws 17 have each a removable face substantially of the form seen at 37 in Fig. 5, which is secured in place by a screw, as shown. These faces may have a groove therein, as shown, for holding cylindrical work and also flat surfaces at the sides of the groove for clamping flat work. The working surfaces of the jaws are made as small as practicable with sufficiency of contact area, so as to concentrate the lines of force between the terminals of the secondary. This idea is carried out in the construction of the contact-face 38 of the abutment 28 and that of the jaw 30, on which the contact-face is indicated by 39, Figs. 6, 7, and 8. It is preferable also to cool the work-holders, and for that purpose water-pipes or suitable channels may be cast therein, as indicated in Figs. 5, 6, and 7.

The primaries of the transformers are preferably connected to the source of current in parallel and each provided with a switch. This arrangement is diagrammatically shown in Fig. 9, wherein 40 and 41 represent the respective primaries, 42 the source of current, and 43 and 44 the switches.

In using the apparatus described to weld a thin piece to the side of a thick one the thick piece is clamped between the jaws 17 and 19 and current turned on, thereby heating the portion of said piece lying between the clamps, the abutment 28 and the thin piece of work being out of touch with the work being heated, or the thin piece may be in touch therewith, if desired. The current flows from one terminal 17 of the conductor 12 to the other through the work clamped upon said terminals by the jaws 19. When the thick piece is sufficiently heated, it, with its clamps, is moved back until it bears snugly against the abutment 28, and at the same time the slide 29 is moved to bring the thin piece of work in the jaws 30 and 31 tight against the thick one. Then the current is turned onto the welding-transformer, and, if desired, it may be turned off from the heating-transformer. When the current is turned into the welding-transformer, it flows from, say, the jaw 30 through the abutted pieces of work to the abutment 28 on the opposite terminal 27. As the pieces of work soften suitable pressure is applied to the lever 37 to produce the necessary upset and effect the weld. The current may then be turned off and the levers 21 and 34 pulled down to free the work.

The abutment 28 is longitudinally slotted, as indicated in Fig. 3, whereby it may be adjusted for different widths of work placed in jaws 17 and 19. It will be noted that the clamps 17 and 19 of the heating-transformer serve as the work-holders for one side of the welding-transformer, so that the heated piece need not be removed from said clamps when thrown into the welding-circuit.

Obviously suitable supports or rests for large work may be attached to the slide 29 or built upon the table in any desired manner suggested to the operator by the shape of the work. There may also be many changes made in details and in the form of parts of this apparatus without departing from the invention.

The invention claimed is—

1. In an electric metal-working apparatus, the combination of an electric heating device, with an electric welding device, means for holding one part of the work in the heating device independently of other parts of the work, means for bringing said part of the work held in the heating device into the circuit of the welding device without moving it from the circuit of the heating device, and means for including another piece of work therewith in the circuit of the welding device.

2. In an electric metal-working apparatus, the combination of an electric heating device provided with clamps for one part of the work, and an electric welding device provided on one terminal with a clamp for another part of the work and having the coöperating terminal located for engagement with the work in the heating-clamps.

3. In an electric metal-working apparatus, the combination of an electric heating-transformer provided with clamps upon the terminals of its secondary for holding one piece of the work, and an electric welding-transformer, having one terminal of its secondary located between the secondary terminals of the heating-transformer at the back of the clamps and the other terminal at the other side of said clamps, as and for the purpose set forth.

4. In an electric metal-working apparatus, the combination with a support for one part of the work, of the coöperating support or clamp whose upper member is borne on an arm arising from the same side of the work as the first support, whereby the apparatus is rendered capable of receiving work of any area.

5. In an electric metal-working apparatus, the combination with the heating-transformer having work-holders movably mounted on its secondary, of a welding-transformer having one pole of its secondary normally fixed and the other provided with a movable work-holder, for the purpose set forth.

6. In an electric metal-working apparatus, the combination with the secondary having one pole or terminal fixed and the other provided with a movable work-holder, the upper member of which is borne by an arm extended to the back of the fixed terminal below the plane of the work-holders and then upwardly and forward, whereby an open space is left in front of the work-holders.

7. In an electric metal-working apparatus, the combination with the secondary of the heating-transformer of a slide upon each terminal thereof each bearing the lower member of a work-holder, an arm mounted upon said slides, a frame pivoted to said arm and carrying at its forward end the upper work-holders, and a lever carried by said arm for closing the work-holders.

8. In an electric metal-working apparatus, the combination with the secondary of the heating-transformer, of a slide upon each terminal thereof each bearing the lower member of a work-holder, an arm mounted upon said slides, a frame pivoted to said arm and carrying at its forward end the upper work-holders, a lever carried by said arm for closing the work-holders, and a lever for moving said slides and the parts mounted thereon.

9. In an electric metal-working apparatus, the combination with the secondary of the heating-transformer, of a slide upon each terminal thereof each bearing the lower member of a work-holder, an arm mounted upon said slides, a frame pivoted to said arm and carrying at its forward end the upper work-holders and means for depressing them, the secondary of the welding-transformer having one terminal located between said slides, a slide upon the other terminal of the latter secondary, a work-holder carried thereby, and a lever for moving said slide and work-holder to and from the coöperating terminal.

10. In an electric welding apparatus, the combination with a heating-transformer and a welding-transformer, of means for holding a piece of work in the former while out of the circuit of the latter, and means for bringing another piece of work into engagement with the first and then including them both in the circuit of the welding-transformer.

11. In an electric metal-working apparatus, the combination with a heating-transformer and a welding-transformer having their secondaries in intersecting planes, of work-holders on the secondary of the heating-transformer serving to clamp the work against one terminal of the secondary of the welding-transformer, and a work-holder on the other terminal of the welding-transformer secondary adapted to carry the other piece of the work against that held by the clamps of the heating-transformer.

12. In an electric metal-working apparatus, the combination of a heating-transformer, a welding-transformer, and work-holders upon the former serving at the same time as work-holders for one side of the secondary of the latter.

Signed at Lynn, in the county of Essex and State of Massachusetts, this 7th day of September, A. D. 1899.

ADOLPH F. RIETZEL.

Witnesses:
FRED. L. NORRIS,
GRACE E. CAHOON.